US012761822B2

(12) United States Patent
Zhang et al.

(10) Patent No.: US 12,761,822 B2
(45) Date of Patent: Oct. 13, 2026

(54) CONTROL METHOD, STORAGE APPARATUS, AND ELECTRONIC DEVICE

(71) Applicant: Lenovo (Beijing) Limited, Beijing (CN)

(72) Inventors: Xuhui Zhang, Beijing (CN); Jingyao Zhang, Beijing (CN); Wenjing Zhang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 18/821,821

(22) Filed: Aug. 30, 2024

(65) Prior Publication Data

US 2025/0077100 A1 Mar. 6, 2025

(30) Foreign Application Priority Data

Aug. 31, 2023 (CN) .......................... 202311118281.6

(51) Int. Cl.
*G06F 3/00* (2006.01)
*G06F 3/06* (2006.01)

(52) U.S. Cl.
CPC .......... *G06F 3/0634* (2013.01); *G06F 3/0619* (2013.01); *G06F 3/0659* (2013.01); *G06F 3/0689* (2013.01)

(58) Field of Classification Search
CPC .... G06F 3/0634; G06F 3/0619; G06F 3/0659; G06F 3/0689
See application file for complete search history.

(56) References Cited

U.S. PATENT DOCUMENTS

| | | | | |
|---|---|---|---|---|
| 8,917,471 | B1 * | 12/2014 | Hasfar | G11B 25/043 360/71 |
| 2001/0022739 | A1 * | 9/2001 | Funaba | G11C 5/06 365/63 |
| 2015/0120995 | A1 * | 4/2015 | Hasfar | G06F 3/0673 711/104 |
| 2021/0092071 | A1 * | 3/2021 | Tortosa | H04L 67/10 |
| 2023/0004290 | A1 * | 1/2023 | Klapman | G06F 3/0674 |

* cited by examiner

*Primary Examiner* — Craig S Goldschmidt
(74) *Attorney, Agent, or Firm* — ANOVA LAW GROUP, PLLC

(57) ABSTRACT

A control method includes obtaining a trigger signal that changes an operation status of an electronic device and controlling a target storage member of the electronic device to switch to an application mode corresponding to the trigger signal to cause the target storage member to respond to different data read/write operations from the electronic device through different data read/write paths. Configuration parameters of the target storage member are different in different application modes.

20 Claims, 6 Drawing Sheets

CONTROL METHOD, STORAGE APPARATUS, AND ELECTRONIC DEVICE

CROSS-REFERENCE TO RELATED APPLICATION

The present disclosure claims priority to Chinese Patent Application No. 202311118281.6, filed on Aug. 31, 2023, the entire content of which is incorporated herein by reference.

TECHNICAL FIELD

The present disclosure relates to the computer technology field and, more particularly, to a control method and an electronic device.

BACKGROUND

A current boot system of an electronic device, such as BIOS code, is typically stored in a separate non-volatile memory on a motherboard of the device, such as flash ROM. Meanwhile, the hard drive (SSD) on the motherboard is usually a module that requires an M.2 slot on the motherboard to enable data interaction and cooperative application between the hard drive and the motherboard. However, the above setup solution leads to high cost for the device, because the device needs a separate chip configured to separately store the data of the boot system and also the slot configured to connect the hard drive module.

SUMMARY

The present disclosure provides a control method. The method includes obtaining a trigger signal that changes an operation status of an electronic device and controlling a target storage member of the electronic device to switch to an application mode corresponding to the trigger signal to cause the target storage member to respond to different data read/write operations from the electronic device through different data read/write paths. Configuration parameters of the target storage member are different in different application modes.

The present disclosure further provides a storage apparatus including a main control chip, a storage area, a first data interface, and a second data interface. The main control chip is configured to control configuration parameters of the storage apparatus under different application modes. The storage area has a data read and write channel with the main control chip and is configured to store a data content. The first data interface and the second data interface are connected to the main control chip and configured to form different data read and write paths with the data read and write channels to cause the storage apparatus to respond to a target data read and write operation through the first data interface and/or the second data interface under different application modes.

The present disclosure further provides an electronic device, including a motherboard and a storage apparatus. The storage apparatus includes a main control chip, a storage area, a first data interface, and a second data interface. The main control chip is configured to control configuration parameters of the storage apparatus under different application modes. The storage area has a data read and write channel with the main control chip and is configured to a store data content. The first data interface and the second data interface are connected to the main control chip and configured to form different data read and write paths with the data read and write channels to cause the storage apparatus to respond to a target data read and write operation through the first data interface and/or the second data interface under different application modes.

DETAILED DESCRIPTION OF THE EMBODIMENTS

Embodiments of the present disclosure are described in detail in conjunction with the accompanying drawings, but these descriptions are not intended to limit the present disclosure.

Various modifications can be made to embodiments of the present disclosure. Therefore, the following description should not be considered limiting but merely exemplary. Those skilled in the art can think of other modifications within the scope and spirit of the present disclosure.

The accompanying drawings, which are included in and form the specification, illustrate embodiments of the present disclosure. The accompanying drawings together with the above general description and the following detailed description of embodiments of the present disclosure are used to describe the principle of the present disclosure.

The features of the present disclosure become obvious through the description of non-limiting embodiments of the present disclosure with reference to the accompanying drawings.

Although the present disclosure is described with reference to some embodiments of the present disclosure, those skilled in the art can realize other equivalent forms of the present disclosure, which have the features of the claims and are within the scope of the present disclosure.

In connection with the accompanying drawings, based on the following descriptions, the above and other aspects, features, and advantages of the present disclosure become more obvious.

Hereafter, embodiments of the disclosure are described with reference to the accompanying drawings. However, embodiments of the present disclosure are merely examples of the present disclosure, which can be implemented in various forms. Known and/or repetitive functions and structures are not described in detail to avoid unnecessary or redundant details that may obscure the present disclosure. Therefore, the specific structural and functional details of the present disclosure are not intended to be limiting but merely as a basis for the claims and representative basis for teaching those skilled in the art to use the present disclosure in any appropriately detailed structure.

The phrases "in one embodiment," "in another embodiment," "in yet another embodiment," or "in other embodiments," used in the specification can refer to the same or different embodiments of the present disclosure.

Embodiments of the present disclosure are described in detail in connection with the accompanying drawings.

Figure 1:
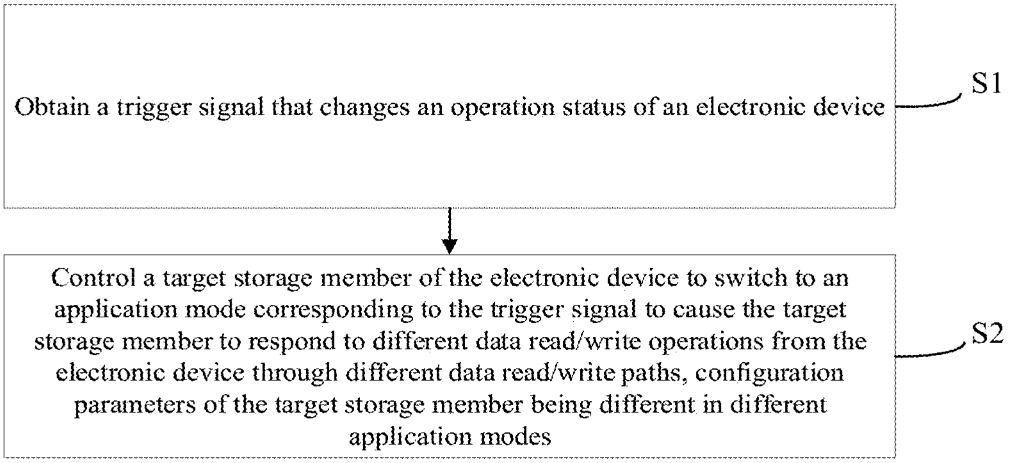
FIG. 1 illustrates a schematic flowchart of a control method according to some embodiments of the present disclosure.

As shown in FIG. 1, embodiments of the present disclosure provide a control method. The method includes the following processes.

At S1, a trigger signal that changes an operation status of an electronic device is obtained.

At S2, a target storage member of the electronic device is controlled to switch to an application mode corresponding to the trigger signal to cause the target storage member to respond to different data read/write operations from the electronic device through different data read/write paths. Configuration parameters of the target storage member are different in different application modes.

For example, when the electronic device is in an off status, a user can start up the electronic device to change the operation status of the device and generate a power-on signal (i.e., the trigger signal). The startup can include manual startup, startup based on the pose of the device, startup based on a connection status with some external members, voice signal, remote control signal, user gestures, or a position relative to the device. In some embodiments, the trigger signal can be a power-off signal generated when the user powers off the electronic device to change the operation status of the device in the power-on status. In some other embodiments, the trigger signal can be a standby signal and wake-up signal generated accordingly when the user can perform power-on standby mode on the electronic device or wake up the electronic device to cause the electronic device to switch to a normal operation mode from the standby mode. The corresponding signal generated due to the change in the operation status of the electronic device can be the trigger signal. Of course, the trigger signal or the embodiments of changing the operation status of the electronic device are not limited to the above. Other embodiments can be included. When the operation status of the electronic device is changed, and the trigger signal is generated, the system can respond to the trigger signal to control the target storage member of the electronic device to cause the target storage member to switch to the application mode corresponding to the trigger signal. In the application mode, the target storage member can support the electronic device to respond to different read/write requests of the same or different members of the electronic device in different data read/write paths. That is, the target storage member can include a plurality of different data read/write paths. In general, one storage member can include one data read/write path. However, the target storage member of embodiments of the present disclosure can include the plurality of different data read/write paths. The plurality of different data read/write paths can be used to support the target storage member to respond to corresponding data read/write operations when the electronic device is in different operation statuses. Thus, the electronic device can read/write the target storage data in different operation statuses. For example, the application model can include a sleep mode and a normal mode. The normal operation mode can include a first operation mode and a second operation mode. For example, when the electronic device is switched from the power-off status to the power-on status, the electronic device may need to experience a power-on preparation phase and a power-on completion phase, e.g., loading and running basic input output system or unified extensible firmware interface (BIOS or UEFI) phase, a self-inspection phase and system start-up, and a normal operation phase. The target storage member can be powered on for running in the phase of loading the boot system to provide a data read/write path for some members (e.g., CPU) of the electronic device to call the stored target data (e.g., BIOS mirror file or UEFI mirror file) to complete a corresponding function to realize the power-on preparation phase of the electronic device. In addition, when the electronic device completes the power-on preparation phase and enters the power-on completion phase of the system, the status can also be considered as the change in the operation status of the electronic device. The target storage member can switch modes too. For example, the mode can include powering on more different data read/write pats. The target storage member can power on different read/write paths in different application modes, or limit which path is used to respond to the read/write request of which member in different modes, or respond to the read/write of which stored data, which is not limited. In some embodiments, the different application modes of the target storage member can have different configuration parameters. For example, the operation voltage, the power consumption, the data interface, and the data transfer speed can be different. In addition, with different application modes, the functions that can be realized or the data can be read/written can be different. For example, in an application mode, the target storage member can only support a first function, or only a first portion of data can be read/written. In another application mode, the target storage member can simultaneously support the first function and a second function, or support all data reading and writing. In addition, for different read/write paths, the configuration parameters can be different, e.g., the data transfer speed, data format, and data type.

Based on the above, the beneficial effects of embodiments of the present disclosure can include improving the functionality of the existing target storage member to reuse the target storage member. Thus, when the operation mode of the electronic device is changed, the target storage member can respond to different data read/write requests in the device with different application modes and different read/write paths. Thus, the electronic device may not need to include too many storage members that have a single-function, store only one type of data, or operate in one condition. The manufacturing cost of the device can be saved, and the arrangement space inside the device can be saved.

In some embodiments, controlling the target storage member of the electronic device to switch to the application mode corresponding to the trigger signal can include the following processes.

At S3, in response to obtaining the first trigger signal of switching the electronic device from a first operation status to a second operation status, the boot system of the electronic device is loaded for running from the target storage member in the first application mode.

At S4, after the boot system completes a target task, the target storage member is controlled to switch from the first application mode to the second application mode to at least respond to the data read/write operations of the target storage member of the electronic device.

The power consumption of the target storage member in the first application mode can be less than the power consumption in the second application mode.

Figure 2:
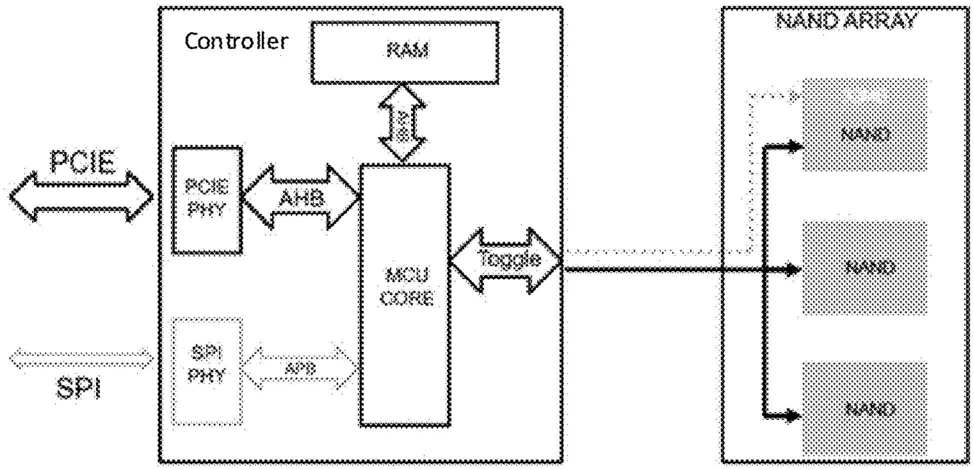
FIG. 2 illustrates a schematic architectural diagram of a target storage member according to some embodiments of the present disclosure.

For example, FIG. 2 illustrates an overall structure of the target storage member. SSD is the target storage member, NAND ARRAY is a storage area, and NAND is a storage block. As shown in FIG. 2, the target storage member stores the boot system data (corresponding to 32 MB area in the figure), e.g., a BIOS program file. The target storage member can include a storage drive, such as a solid-state disk (SSD), a hard disk drive (HDD), a FLASH, etc. When the electronic device is in the power-off status, the target storage member can be in the first application mode. In response to obtaining the first trigger signal generated when the electronic device is switched from the power-off status to the power-on status, the system can load the boot system stored in the target storage member directly through the target storage member in the first application mode to complete the power-on of the device to cause the device to operate normally. When controlling loading the boot system, in response to the signal used to instruct the system to load the boot system such as an address search signal of the boot system, the boot system data can be read from the target storage member. In some embodiments, the boot system can be directly loaded from the target storage member for processing the first application mode only in response to the first trigger signal without depending on the instructions of other signals. After completing the task related to boosting the device system to complete start-up, e.g., completing the loading of the boot system, or after completing the task such as power-on initialization of the device, the system can automatically control the target storage member to switch from the current first application mode to the second application mode. Thus, in the second application mode, the target member of the device can be supported to access some or all data or perform data writing. The target member can be hardware or software, e.g., an operating system, an application, a processor, a south bridge chip, and a north bridge chip. In some embodiments, the power consumption of the target storage member in the first application mode can be less than the power consumption in the second application mode. With such a configuration, during the start-up preparation phase, e.g., loading the boot system phase, and performing power-on initialization/power-on self-inspection phase, the device can be supported to operate in a low voltage mode. When the device completes start-up and enters a normal application status, the target storage member can be switched to the second application mode. The second application mode can have high operation power consumption, which matches the current operation power consumption of the device. Moreover, the high-power consumption mode can also mean that the response speed of the target storage member or the performed function can be improved compared to being in the first application mode. When being used with the device normally, the application needs and requirements of the device or the user for the target storage member can be positively proportional. That is, based on the second application mode, the target storage member can satisfy the application of the device or user.

In some other embodiments, controlling the target storage member of the electronic device to switch to an application mode corresponding to the trigger signal is not limited to the above embodiment and can include at least one of:

at S5, in response to obtaining a second trigger signal of switching the electronic device from the second operation status to the first operation status, controlling the target storage member to switch from the second application mode to the first application mode;

at S6, in response to obtaining a third trigger signal generated of switching the electronic device from a third operation status to the first operation status, controlling the target storage member to switch from the second application mode to the first application mode; and at S7, in response to obtaining a fourth trigger signal of switching the electronic device from the second or third operation status to a fourth operation status, controlling the target storage member to switch from the second application mode to the third application mode.

The power consumption of the target storage member in the second application mode can be greater than the power consumption in the first application mode.

In some embodiments, switching the electronic device from the second operation status to the first operation status can at least be from the power-on status to the standby status of the electronic device. For example, the electronic device can be switched from the normal operation status to the power-off status, or the electronic device can be switched to the power-off status during the power-on self-inspection phase. As the operation status of the electronic device changes, the second trigger signal can be generated. Then, in response to the second trigger signal, the system can control the storage member to switch from the second application mode to the first application mode.

Switching the electronic device from the third operation status to the first operation status can at least include that the electronic device is switched from the normal operation status to the power-off status. As the operation status of the electronic device switches, the system can generate the third trigger signal. In response to the third trigger signal, the system can control the target storage member to switch from the second application mode to the first application mode.

Switching the electronic device from the third operation status to the first operation status at least can include that the electronic device is switched from the normal operation status to the power-off status. With the switching of the operation status of the electronic device, the system can generate the third trigger signal. In response to the third trigger signal, the system can control the target storage member to switch from the second application mode to the first application mode. The electronic device can be switched from the second operation status, the third operation status, or the first operation status to the fourth operation status. In summary, the electronic device can be switched from the power-on status to the power-off status. The first operation status, the second operation status, and the third operation status can be the power-on status, and the further operation status can be the power-off status. As the operation status of the electronic device is switched, the system can generate the fourth trigger signal. In response to the fourth trigger signal, the system can control the target storage member to switch from the second application mode or the first application mode to the third application mode. The first application mode and the second application mode can belong to the power-on application mode, and the third application mode can belong to the power-off mode.

In addition, the electronic device can be switched from the third operation status to the second operation status. For example, the electronic device can at least be switched from the normal operation status to the standby status. As the operation status of the electronic device switches, the system can generate a fifth trigger signal. In response to the fifth trigger signal, the system can control the target storage member to switch from the second application mode to the first application mode. That is, after the electronic device enters the low power consumption mode or ModernStandby mode, the electronic device can control the target storage member to enter the low power consumption mode.

The power consumption of the target storage member in the second application mode can be higher than the power consumption in the first application mode. Based on the configuration and the above embodiments, the first application mode can correspond to the electronic device being in a power-on mode, a standby mode, or another low-power consumption operation mode. For example, an electronic device startup preparation phase can be considered as an electronic device loading operation boot system phase, power-on initialization/power-on self-detection phase, or other modes with only operation member functions. The method for realizing the low power consumption operation mode may not be unique. In some embodiments, the target storage member can operate in the first application mode when the device is in the low-power consumption operation mode. The low-power consumption operation mode may not be unique. However, the low-power consumption operation mode can be determined to be lower than the power consumption of the normal operation mode of the system. For the second application mode, the electronic device can at least be in the normal application mode. The mode, in which the target storage member operates, can ensure that the target storage member can normally perform the task within the function range when the electronic device operates before. The third application mode can be a mode corresponding to the electronic device being powered off. Based on the third application mode, the target storage member of embodiments of the present disclosure can support the electronic device to switch from the power-off status to the power-on status to automatically switch to the first application mode without system control. In some embodiments, the system can also control the target storage member to switch to the first application mode after the device is powered on.

In some other embodiments, controlling the target storage member of the electronic device to switch to an application mode corresponding to the trigger signal can also include: at S8, controlling the target storage member to switch to the corresponding data interface and/or power parameters to respond to different data read/write operations from the electronic device.

For example, the target storage member can include at least two data interfaces. In some embodiments, two data interfaces can be included. The two data interfaces can include a first data interface and a second data interface. The configuration parameters of the two interfaces can be different, and data types, formats, and protocols used for transmission can also be different. When the electronic device generates a target trigger signal due to a change in the operation status, in response to the trigger signal, the system can control the target storage member to switch to the corresponding application mode. For different application modes, the power parameters corresponding to the target storage member and one or all of the data interfaces configured for data transmission can be different. For example, the transmission speed of the first data interface can be lower than that of the second data interface, or the operation voltage required for the first data interface can be lower than the operation voltage required for the second interface. In some other embodiments, the first data interface can be configured to transmit the first type data according to a first protocol, and the second data interface can be configured to transmit the second type data according to a second protocol. Based on this, when the system controls the target storage member to be in the corresponding application mode according to the current trigger signal, the meaning represented by the trigger signal can be determined first, the current status of the device can be determined, and with which power parameter the target storage member operates can be determined based on the status, and which interface needs to be started up to read/write data can match the current status of the device better. For example, when the device is in the power-off status or the sleep status, the required voltage can be low. Thus, the system can control the first data interface of the target storage member to operate. The target storage member can operate with a low voltage and low current parameter. Otherwise, if the electronic device is in the normal application mode, the electronic device can control the target storage member to operate with a normal voltage and normal current parameter. Meanwhile, the second data interface can be started up for use, or the first data interface and the second data interface can be started simultaneously to respond to different data read/write operations of the electronic device. In general, when the electronic device is in the low power operation status, generated read/write operations can be few, and the speed may not need to be too high. Thus, in this status, the first data interface can used to operate to respond to the read/write operation from the electronic device, which can also satisfy the read/write requirement of the device in the status. When the electronic device is in the normal operation status, the read/write quantity of the device may increase, which has a high requirement for the speed. Thus, if the first data interface is used, the device requirement cannot be satisfied. Thus, the second data interface can be used to complete the response.

In practical applications, the number and type of data interfaces are not limited. For example, three or four data interfaces can be provided, and the data interfaces can have different configuration parameters. Some data interfaces can have same configuration parameters, for example, the configuration parameters of the four data interfaces can be the same.

In some embodiments, controlling the target storage member to switch from the first application mode to the second application mode can include:

at S9, controlling the target storage member to switch from the first data interface to the second data interface, and controlling the target storage member to switch from the first power parameter to the second power parameter to respond to the data read/write operation from the target member of the electronic device through the second data interface; and/or controlling the target storage member to switch from the second application mode to the first application mode can include:

at S10, controlling the target storage member to switch from the second data interface to the first data interface and controlling the target storage member to switch from the second power parameter to the first power parameter to respond to the data read/write operation from the electronic device through the first data interface.

The speed of the target storage member performing the data reading and writing through the first data interface can be slower than the speed of the target storage member performing the data reading and writing through the second data interface. The power consumption of the target storage member in the first power parameter can be smaller than the power consumption in the second power parameter.

Figure 3:
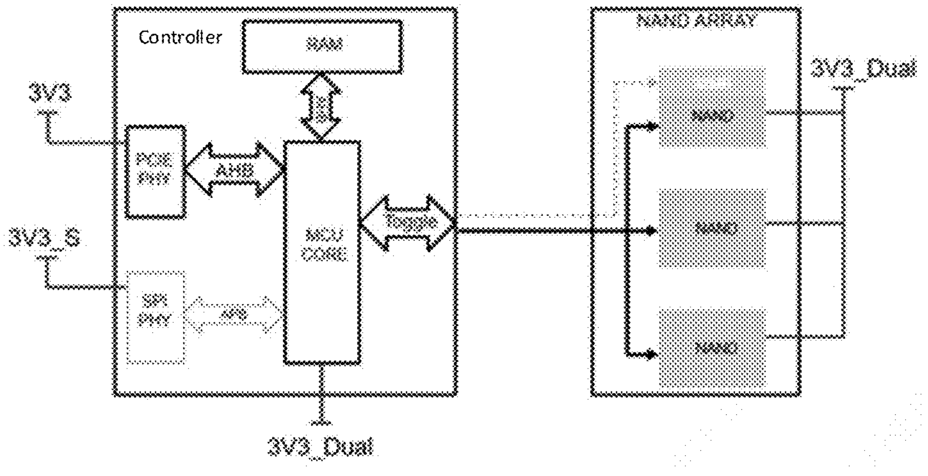
FIG. 3 illustrates a schematic diagram showing power supply distribution of a target storage member according to some embodiments of the present disclosure.
Figure 4:
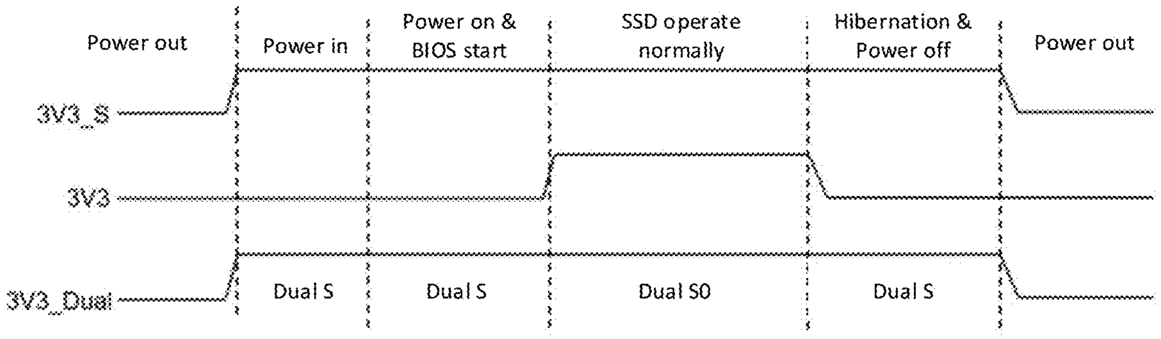
FIG. 4 illustrates a schematic diagram showing power supply distribution of a target storage member in different device operation statuses according to some embodiments of the present disclosure.

For example, the target storage member of embodiments of the present disclosure can be but is not limited to a hard drive, which can support two different operation modes, including a low power mode and a high-power mode, or a low power consumption mode and a high power consumption mode. For example, as shown in FIGS. 3 and 4, the target storage member supports a dual-voltage operation mode. FIG. 4 illustrates the operation voltage of the target storage member when the device is in different operation statuses. The dual-voltage operation mode of the storage member is represented as 3V3-dual in FIG. 3 and FIG. 4, which shows that the storage member can operate in a low voltage, e.g., 3V3-s, and in a high voltage, e.g., 3V3. Meanwhile, the target storage member can include a first data interface and a second data interface. The first data interface can operate based on a first configuration parameter, and the second data interface can operate based on the second configuration parameter. Values of the first configuration parameter can be smaller than values corresponding to the second configuration parameter, such as the data read/write speed, operation power, operation voltage, e.g., 3V3 and 3V3-s in the drawings, protocols of the two data interfaces for transmitting data, data format and type. In some embodiments, the first data interface can be configured to transmit data based on an SPI protocol, and the second data interface can be configured to transmit data based on a PCIE protocol, which is not limited in embodiments of the present disclosure. The protocol types are only described as examples. The transmission protocol can be determined according to the data that needs to be read and written through the first data interface and the second data interface. In practical applications, the first data interface of embodiments of the present disclosure can be connected to the SPI bus (or I2C bus, UART bus) to receive or output the data corresponding to the format. The second data interface can be connected to the PCIE bus (SATA bus and M.2 bus) to receive or output the data corresponding to the format. According to the characteristics of the SPI and PCIE protocols, the data transmission speed of transmitting the data based on the SPI protocol can be slower than the data transmission speed of transmitting the data based on the PCIE protocol. Further, when the target storage member is controlled to switch from the first application mode to the second application mode, the target storage member can be controlled to switch from the first data interface to the second data interface or a status in which the first data interface and the second data interface are powered on simultaneously. That is, in the second application mode, the second data interface may need to be in the power-on status, and the first data interface can be in the power-on status or the power-off status, which is not limited. Meanwhile, to support the second data interface to operate normally, the power parameter of the target storage member may need to be adjusted to match the operation requirement of the second data interface. The first power parameter can be lower than the second power parameter. The first power parameter can be used to support the target storage member to operate in the low voltage mode and through the first data interface, and the second power parameter can be used to support the target storage member to operate in the high voltage mode and through the second data interface. When the target storage member is controlled to switch the data interfaces. The power parameter can be simultaneously adjusted accordingly. For example, the target storage member can be switched from the first power parameter to the second power parameter to ensure the second data interface to operate normally. Thus, the data read/write operation from the target member of the electronic device can be responded to through the second data interface.

When the target storage member is controlled to switch from the second application mode to the first application mode, similarly, the system may need to control the data interfaces and power parameters of the target storage member to perform matching and replacement. In some embodiments, the target storage member can be controlled to switch from the second data interface to the first data interface, or the second data interface can be powered off, and the first data interface can be powered on or can continue to maintain the power-on status. Meanwhile, the target storage member can be controlled to switch from the second power parameter to the first power parameter. For example, when the second data interface is powered off, the supply of a path of high voltage can be cut off. Thus, the target storage member can operate currently only based on the low voltage supply, or members that need to continue to operate in the target storage member can be directly adjusted to be in the low voltage mode. That is, the involved members can support the dual-voltage mode to cause the target storage member to operate in the low voltage mode/the lower power operation mode. Thus, the target storage member can respond to the data read/write operation from the electronic device through the first data interface.

Furthermore, controlling, by the system, the target storage member to switch to the corresponding data interface and/or power parameter to respond to different data read/write operations from the electronic device includes:

at S11, in response to obtaining a first trigger signal when the electronic device switches from the first operation status to the second operation status, loading the boot system of the electronic device through the first data interface of the target storage member; and at S12, after the boot system completes the target task, controlling the target storage member to switch from the first data interface to the second data interface, and controlling the target storage member to switch from the first power parameter to the second power parameter to respond to the data read/write operations of the target member of the electronic device through the second data interface.

The speed of the target storage member performing the data reading and writing through the first data interface can be slower than the speed of the target storage member performing the data reading and writing through the second data interface. The power consumption of the target storage member in the first power parameter can be smaller than the power consumption of the target storage member in the second power parameter.

For example, in response to the first trigger signal when the electronic device switches from the standby status to the normal operation status, or when the electronic device switches from the power-off status to the normal operation status, the system can then send an instruction to the target storage member through the first data interface. The address of the boot system data stored in the target storage member can be searched. Then, the system can load the boot system data based on the first data interface to complete loading and running the boot system. After the boot system completes the power-on, power-on initialization of the firmware and hardware, or the power-on self-detection, the system can control the target storage member to switch from the first data interface to the second data interface. The switching can include powering off the first data interface and powering on the second data interface, or powering on the second data interface and maintaining the first data interface to be in the power-on status. In some other embodiments, the data transmission right can be handed over from the first data interface to the second data interface. Thus, in the current application mode, at least most of the read/write operations can be completed by the second data interface. That is, the data read/write operations of the target member of the electronic device can be responded to through the second data interface. In some embodiments, the speed of the target storage member performing the data reading and writing through the first data interface can be slower than the speed of the target storage member performing the data reading and writing through the second data interface, and the power consumption of the target storage member in the first power parameter can be smaller than the power consumption in the second power parameter.

Furthermore, loading and running the boot system of the electronic device through the first data interface of the target storage member can include:

at S13, loading and running the boot system of the electronic device through the first data read/write path formed between the first data interface and the controller core and the storage area of the target storage member, or through the second data read/write path formed among the first data interface, the physical layer of the second data interface, the controller core and the storage area of the target storage member; and/or, responding to the data read/write operation of the target member of the electronic device through the second data interface can include;

at S14, responding to the data read/write operation through the third data read/write path formed among the second data interface and the controller core, and the storage area of the target storage member.

In some embodiments, the target storage member can include a controller and a memory/storage area. The storage area can include a plurality of storage blocks/partitions, and the controller can include a controller core. The controller, for example, can be a main control chip of a hard drive. The data interfaces can be arranged on the controller (main control chip) and connected to the controller core. The first data read/write path can be formed among the first data interface, the controller core, and the storage area. A first storage block can be pre-partitioned in the storage area to store the boot system data. Thus, when the boot system of the electronic device is loaded to run, the controller core can respond to the instruction to call the boot system from the first storage partition of the storage area for the electronic device to load the boot system to run.

As shown in FIG. 2, the first data interface of embodiments of the present disclosure is an SPI data interface. The second data interface is a PCIE data interface. The controller can include processing modules configured to process PCIE data and SPI data, respectively, such as "PCIE PHY" and "SPI PHY" in the drawing. The two modules are connected to the controller core through corresponding data lines, such as an AHB data line and an APB data line shown in FIG. 2, to input or output corresponding data. With such setting, the first data interface can independently interact with the controller core for data exchange.

Figure 5:
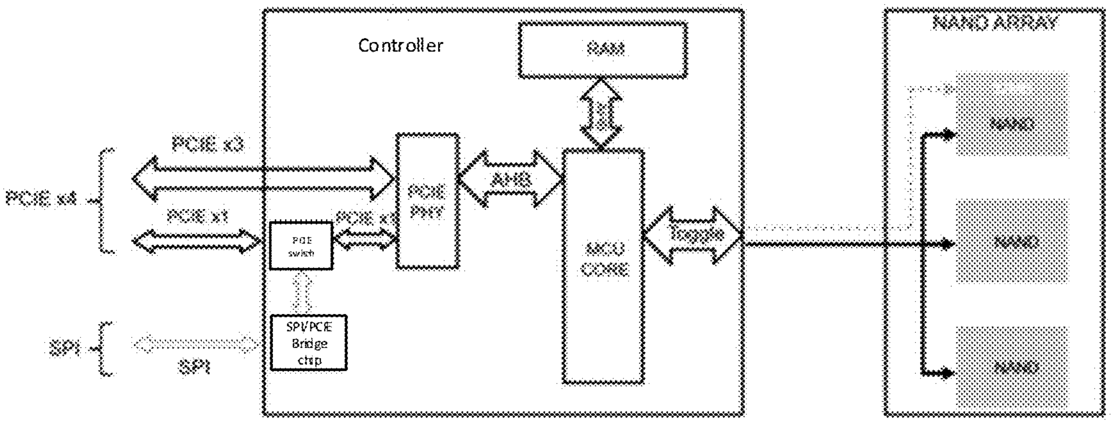
FIG. 5 illustrates a schematic architectural diagram of another target storage member according to some embodiments of the present disclosure.

In some other embodiments, as shown in FIG. 5, the first data interface is not directly connected to the controller core through a unique data line. Instead, the first data interface needs to be connected to the controller core through the physical layer of the second data interface. For example, the second interface can be a PCIE interface, and the first interface can be an SPI interface. The controller may no longer include the "SPI PHY" mentioned above. Instead, a bridge chip that converts data between PCIE and SPI formats can be provided. Then, the second data interface may need to be configured as a combination of a first sub-interface and a second sub-interface. Based on the characteristics of the PCIE interface, the PCIE interface can support the interface configuration. For example, some channels of the interface can form the first sub-interface, and the remaining channels can form the second sub-interface. In some embodiments, a number of channels forming the first sub-interface can be less than the number of channels forming the second sub-interface. For example, if the second data interface is a PCIE X4 interface, the second data interface can be configured as a combination of PCIE X3 and PCIE X1 sub-interfaces. The two sub-interfaces can be connected to "PCIE PHY" to be connected to the controller core through "PCIE PHY." The first sub-interface can be connected to "PCIE PHY" via the first data line, and the second sub-interface can be connected to the "PCIE PHY" via the second data line. The first data interface can be connected to the first data line through the bridge chip to be connected to the controller core via the first data line and the "PCIE PHY." In practical applications, a switch can be arranged on the first data line, such as the PCIE switch shown in the drawing. The bridge chip may not be connected to the switch. When the first data interface is powered on, the switch can be in a power-on status. The data received by the first data interface can enter the first data line through the switch after being converted by the bridge chip. Then, the data can be transmitted to the controller core by the first data line. For example, the system can complete loading and running the boot system through the second data read/write path formed by the first data interface, the bridge chip, the switch, the first data line, the controller core, and the storage area. When the first data interface is powered off, the first data interface can be stopped for use. The switch can be controlled to be off. Then, the first data line can be connected to the first sub-interface and the controller core and configured to transmit data. When the second data interface is powered on, the performance of the second data interface can be restored, or the system can group the two sub-interfaces to form the configuration of the original second data interface through the controller core, which is not limited.

When the second data interface is powered on, the target storage member can operate normally. Then, the read/write requests for data outside of the boot system in the storage area can be responded to by the second data interface. The data read/write operation can be then responded to by the third data read/write path formed by the second data interface, the controller core of the target storage member, and the storage area.

In some other embodiments, as shown in FIG. 2, only one data bus is arranged between the storage area and the controller core to transmit the read/write data. Therefore, when a plurality of members simultaneously send requests to the target storage member, especially when read/write requests are made simultaneously through the first data interface and the second data interface to the target storage member, the target storage member may need to make a certain response to avoid impact the response of some more important read/write requests without missing responses to any read/write request. The method of embodiments of the present disclosure further includes at least one of the following processes.

At S15, in response to receiving data read/write operations from the first member and second member of the electronic device, the data read/write operations from the first member and the second member are responded to through the only data read/write channel between the controller core and the storage area of the target storage member with time-sharing. The first member can perform the data read/write operation on the first block of the storage area through the first data interface, and the second member can perform the data read/write operation on the second block of the storage area through the second data interface.

At S16, in response to receiving data read/write operations from the first member and second member of the electronic device, the data read/write operation from the first member can be responded to through the first data read/write channel between the controller core and the storage area of the target storage member, and the data read/write operation from the second member can be responded to through the second data read/write channel between the controller core and the storage area of the target storage member. The first member can perform the data read/write operation on the first block of the storage area through the first data interface, and the second member can perform the data read/write operation on the second block of the storage area through the second data interface.

For example, the storage area can be divided into the first block to store the data of the boot system. To avoid access from the user, the first block can be set to a hidden area, which is invisible to the outside and only visible to the internal system. The other blocks of the storage area can be referred to as a second block. The second block can be visible and can be configured to store data accessible by the user. When the first member and the second member of the electronic device send the read/write requests to the target storage member, in response to the data read/write operations from the first member and the second member of the electronic device, a time-sharing rule can be set. For example, the operation request received by the first data interface can be processed in a first time segment. The operation request received by the second data interface can be processed in a second time segment. The first time segment and the second time segment can be configured alternatively. Thus, no operation request can be missed, and all operation requests can be responded to. In some embodiments, the data read/write operations from the first member and the second member can be responded to through the only data read/write channel between the controller core and the storage area of the target storage member with time sharing. The first member can perform the data read/write operation on the first block of the storage area through the first data interface. The second member can perform the data read/write operation on the second block of the storage area through the second data interface.

In some other embodiments, a priority rule can be set to set the operation request received by the first data interface with a high priority, and the operation request received by the second data interface with a low priority. When the operation requests from the two interfaces are received simultaneously, the controller core can respond to the operation request of the first data interface first, and then respond to the operation request received by the second data interface. In some other embodiments, the priority can be set for the operation requests. A highest priority can be set for the read/write request of the first block. That is, the read/write request of the first block can be responded to first. The other operation requests received by the first data interface and the operation requests received by the second data interface can be performed based on the above priority rule, or the operation requests can be further distinguished to determine a matching priority. Then, the operations can be responded to according to the priority.

In still other embodiments, the only data bus of the controller core and the storage area can be divided. A part of the channel can form a first data channel, and the other part of the channel can form a second data channel. The first data channel can connect the storage block storing the boot system data and the controller core, and the second data channel can connect all other storage blocks of the storage area and the controller core. When the read/write requests simultaneously or separately received from the first data channel and the second data channel are processed, the controller core can perform the reading and writing on the target data through the corresponding data channel based on different read/write requests. For example, in response to obtaining the requests of the data read/write operations from the first member and the second member of the electronic device, the data read/write operations from the first member can be responded to through the first data read/write channel between the controller core and the storage area of the target storage member. The data read/write operation from the second member can be responded to through the second data read/write channel between the controller core and the storage area of the target storage member. The first member can perform the data read/write operation on the first block of the storage area through the first data interface, e.g., the read/write operation to the boot system. The second member can perform the data read/write operation on the second block of the storage area through the second data interface, e.g., the read/write operation to the non-boot system data.

Furthermore, since the function of the boot system is important, if the boot system is damaged or is not accessed due to the damage of the first block, the electronic device cannot start up normally. Thus, to avoid original data loss, the method of embodiments of the present disclosure includes at least one of the following processes.

At S17, in response to the failure to load data from the first block of the storage area of the target storage member, the controller core of the target storage member can search an address from a backup block of the target data file in the first block and loads the target data file from the backup block.

At S18, the storage area of the target storage member is able to operate under two different power parameters simultaneously to simultaneously respond to two different types of data read/write operations.

Figure 6:
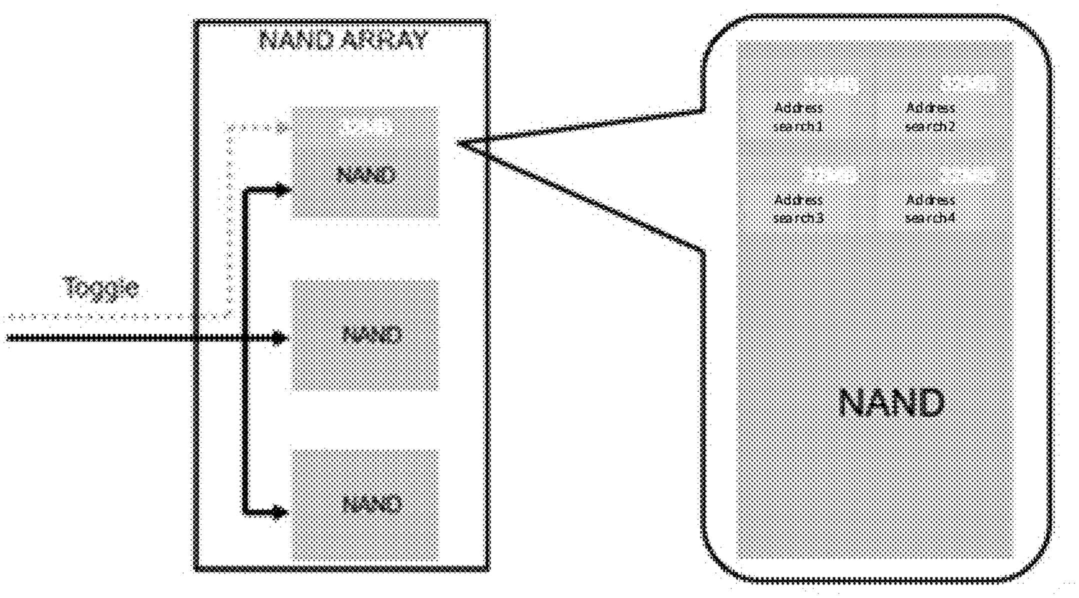
FIG. 6 illustrates a schematic structural diagram showing storage partitions of a target storage member according to some embodiments of the present disclosure.

For example, as shown in FIG. 6, the first block of the storage area, which stores boot system data, includes a plurality of partitions. The boot system is stored in a first partition, and the backup data can be stored in a second partition or other partitions. In some other embodiments, the backup data can be stored in other blocks. The amount of the backup data is not limited. One or a plurality of packs of data can be provided. The plurality of packs of data can be stored at different blocks or different partitions of the same block. Index information for the backup data can be stored in the block where the boot system is stored for the controller core to refer to the required backup data. When the boot system data is lost or the partition of the first block where the boot system is stored, the boot system cannot be normally loaded. In response to the failure of loading the data from the first block of the storage area of the target storage member, the system can locate the backup data of the boot system according to the index information through the controller core to load the backup data to start up the electronic device.

The storage area or at least the block or partition where the backup data of the boot system is stored of embodiments of the present disclosure can operate under two types of different power parameters, for example, 3V3 voltage or 3V3-s voltage. That is, the storage area or at least the block or partition where the backup data of the boot system is stored of embodiments of the present disclosure can support dual-voltage operation to cause the storage area or at least the block or partition to simultaneously respond to the two different types of data read/write operations.

Figure 7:
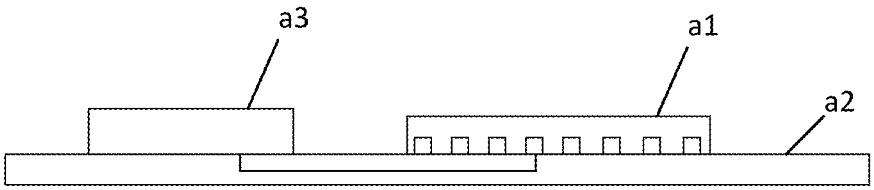
FIG. 7 illustrates a schematic diagram showing a connection relationship between a storage member and a motherboard according to some embodiments of the present disclosure.

As shown in FIG. 7, some other embodiments of the present disclosure provide an electronic device, including a motherboard al, a target storage member b2, a processor c3.

The target storage member b2 is arranged at the motherboard al.

The processor c3 is arranged at the motherboard al and is connected to the target storage member b2 to control the target storage member b2 based on the control method above.

That is, the control method can be applied to the processor c3 of the electronic device of embodiments of the present disclosure. The processor c3 can perform the above control method to control the target storage member b2. The electronic device of embodiments of the present disclosure can include but is not limited to a laptop computer and an all-in-one computer.

Some other embodiments of the present disclosure also provide a storage medium. The storage medium can store a program. When the program is running, the device including the storage medium can be controlled to perform the control method above.

Embodiments of the present disclosure also provide a computer program product. The computer program product can be tangibly stored on a computer-readable medium and include computer-readable instructions. When the computer-readable instructions are performed, at least one processor can be caused to perform the control method above. Solutions of embodiments of the present disclosure can have the corresponding technical effects above, which are not repeated here.

Figure 8A:
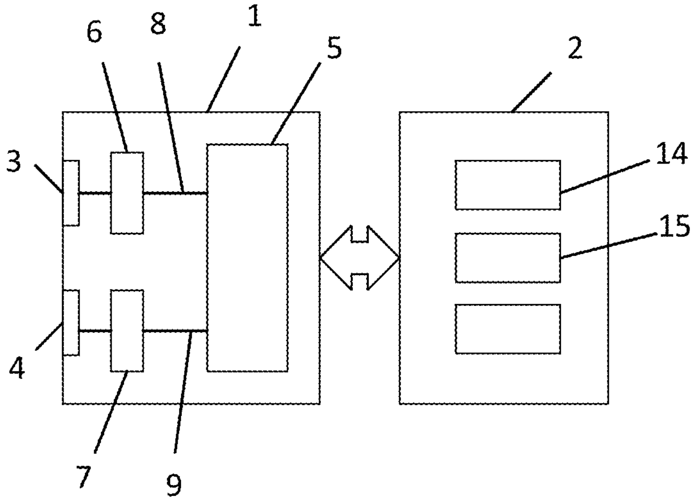
FIG. 8A illustrates a schematic structural diagram of a storage member according to some embodiments of the present disclosure.

Further, as shown in FIG. 8A, embodiments of the present application provide a storage member, including a main control chip 1, a storage area 2, a first data interface 3, and a second data interface 4.

The main control chip 1 is configured to control the configuration parameters of the storage member in different operation modes.

The storage area 2 includes a data read/write channel with the main control chip 1 and be configured to store data content.

The first data interface 3 and the second data interface 4 are connected to the main control chip 1 and form different data read/write paths with the data read/write channel. Thus, the storage member can respond to the target data read/write operations through the first data interface 3 and/or the second data interface 4 under different application modes.

For example, the storage member can be a hard drive (module), which can include a controller and a memory. The main control chip 1 can form the controller. The first data interface 3 and the second data interface 4 can be arranged at the controller. The storage area 2 can be the memory. The memory can be connected to the controller through the data read/write channel formed by the data bus.

In some embodiments, the main control chip 1 includes a controller core 5, a first interface physical layer 6, and a second interface physical layer 7.

The controller core 5 can store configuration information of the storage member in different operating modes to cause the storage member to operate under different application modes.

The first interface physical layer 6 can be connected to the controller core 5 via a high-speed bus 8 to allow the storage member to provide the second data interface to the outside.

The second interface physical layer 7 can be connected to the controller core 5 via a low-speed bus 9 to allow the storage member to provide a second data interface to the outside.

The storage member can respond to the target data read/write operations through the first data read/write path formed by the controller core 5 and the first interface physical layer 6 and/or through the second data read/write path formed by the controller core 5 and the second interface physical layer 7 under different application modes.

For example, the controller core 5 can include but is not limited to MCU. The second interface can be a PCIE interface corresponding to the first interface physical layer (PHY), which is PCIE PHY shown in FIG. 2. The second interface physical layer is SPI PHY shown in FIG. 2. The first interface physical layer 6 can be correspondingly connected to the first interface 3. The second interface physical layer 7 can be correspondingly connected to the second interface 4. Meanwhile, the first interface physical layer 6 can be connected to the controller core 5 through the high-speed bus 8 to quickly respond to the data read/write request. The second interface physical layer can be connected to the controller core 5 through the low-speed bus 9 to respond to the data read/write request in a low power consumption status. Since the storage member has different application modes, the storage member can form different data read/write paths to respond to different data read/write requests based on the different data interfaces in the different application modes. For example, in the first application mode, the storage member can respond to the data read/write operation based on two paths, which include the first data read/write path formed by the controller core and the first interface physical layer 6 and the second data read/write path formed by the controller core 5 and the second interface physical layer 7, or respond to the target data read/write operation only through the first data read/write path. In the second application mode, the storage member can respond to the target data read/write operation through the second data read/write path.

Figure 8B:
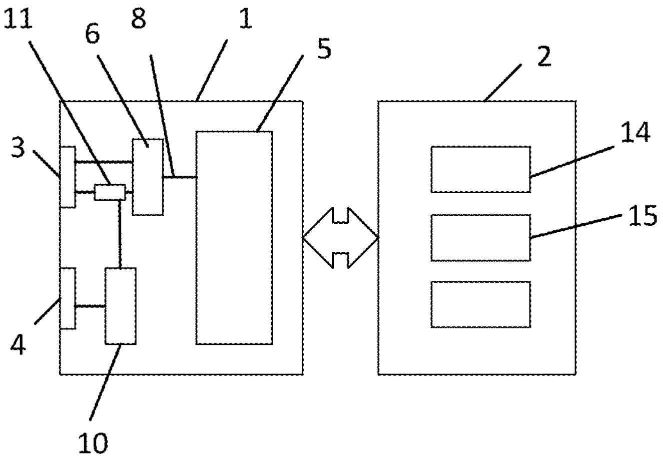
FIG. 8B illustrates a schematic structural diagram of another storage member according to some embodiments of the present disclosure.

In some other embodiments, as shown in FIG. 8B, the main control chip 1 includes the controller core 5, the first interface physical layer 6, and a first bridge chip 10.

The controller core 5 can store configuration information of the storage member under different application modes. Thus, the storage member can operate under different application modes.

The first interface physical layer 6 can be connected to the controller core 5 through the high-speed bus 8. Thus, the storage member can provide the first data interface to the outside.

The first bridge chip 10 can be connected to the first interface physical layer 6 through the switch 11. Thus, the storage member can reuse the data channel between the first interface physical layer 6 and the controller core 5 to provide the second data interface to the outside.

Under different application modes, the storage member can respond to the target data read/write operation through the first data read/write path or through the third data read/write path formed by the controller core 5, the first interface physical layer 6, the switch 11, and the first bridge chip 10.

Compared to the above, the second interface physical layer 7 is not included, instead the first bridge chip 10 is provided. The second interface can be connected to the first interface physical layer 6 through the first bridge chip 10 and the switch 11 arranged on the data channel between the first interface and the first interface physical layer 6. Thus, the storage member can reuse the data channel between the first interface physical layer 6 and the controller core 5 to provide the second data interface to the outside. In the first application mod, the storage member can respond to the target data read/write operation through the first data read/write path formed by the controller core 5 and the first interface physical layer 6. In the second application mode, the storage member can respond to the target data read/write operation through the third data read and writer path formed by the controller core 5, the first interface physical layer 6, the switch 11, and the first bridge chip 10.

Further, the storage member can include a first power supply circuit and a second power supply circuit.

The first power supply circuit can be configured to supply power to the main control chip 1 and the storage area 2 through the first data interface.

The second power supply circuit can be configured to supply power to the main control chip 1 and the storage area 2 through the second data interface.

Under different application modes, the storage member can receive the power supply provided to the electronic device through the first power supply circuit and/or the second power supply circuit.

The power supply voltage provided by the first power supply circuit can be greater than the power supply voltage provided by the second power supply circuit.

As shown in FIG. 3 and FIG. 4, the main control chip 1 and the storage area 2 support dual-voltage power supply. The first power supply circuit of the storage member can be configured to supply power to the main control chip 1 and the storage area 2 through the first data interface. The voltage can be a low voltage, e.g., 3V3-s. The storage member can supply power to the main control chip 1 and the storage area 2 through the second data interface. The voltage can be a high voltage, e.g., 3V3. Corresponding to different application modes, i.e., corresponding to different turned-on interfaces, the storage member can receive the power supply provided to the electronic device through the first power supply circuit and the second power supply circuit or only through the first power supply circuit or the second power supply circuit under different application modes.

Further, in the storage member, the storage area 2 can include at least one first block 14 and at least one second block 15.

The first block 14 can be configured for a first type data read/write operation.

The second block 15 can be configured for a second type data read/write operation. The second type can be different from the first type.

Under different application modes, the storage member can support different types of data read/write operations.

For example, the first block 14 can be a hidden area and used to store system data, e.g., the boot system data, to start up the electronic device. The first type data can be considered as realizing a certain function of the electronic device, i.e., only for internal use of the device, and can belong to the data type of the system data. The data type can be stored in the first block 14. The first block 14 can be set as invisible to the user to prevent the user from accessing the stored first type data and even changing this type of data to cause operation errors in the device. The second block 15 can be a non-invisible area. The data stored in the second block 15 can be accessed by the user. Under different application modes, the storage member can support different data to realize the read/write operations. For example, in the first application mode, the data of the second block 15 cannot be accessed, and only the data of the first block 14 can be accessed, which is not limited. In some embodiments, even in the first application mode, the storage member can realize the data read/write operation of the second block 15, which is not a normal scenario but a special scenario. In the normal status, in the first application mode, only the first type data can be accessed. In the second application mode, the second type data can be accessed, and the first type data can be accessed.

In some embodiments, the first data read/write channel can be arranged between the controller core 5 of the main control chip and the first block 14, and the second data read/write channel can be arranged between the controller core 5 and the second block 15. Different types of data read/write operations can be responded to through the first data read/write channel or the second data read/write channel.

For example, when only one data bus is provided between the main control chip 1 and the storage area 2, a part of channel can be divided and assigned to the first block 14, and the remaining channel can be assigned to the second block 15. Thus, the two blocks can have corresponding data read/write channels to realize the data read/write operations. In some other embodiments, two data buses can be provided between the main control chip and the storage area, the first data bus can be used to provide service for the first block 14, and the second data bus can be used to provide service for the second block 15. The two data buses can form the first data read/write channel and the second data read/write channel, respectively.

In some other embodiments, the first block 14 and the second block 15 can share the third data read/write channel between the storage area 2 and the controller core 5 of the main control chip 1. The third data read/write channel can respond to the data read/write operations for the first block and the second block at different timing.

For example, only one data bus can be provided between the main control chip 1 and the storage area 2. The data bus can form the third data read/write channel. When the read/write operations of different interfaces are responded to without the above channel division method, the read and write operations can be responded to according to a time-sharing rule. For example, the first time segment and the second time segment can be set alternatively. In the first time segment, the storage member can respond to the data read/write operation for the first block through the third data read and writer channel. In the second time segment, the storage member can respond to the data read/write operation for the second block through the third data read/write channel.

In addition, the third data read/write channel can be reused by a priority setting method. For example, no matter when the data read/write operation for the first block can be responded to first, and then, the data read/write operation for the second block can be responded to.

Figure 10:
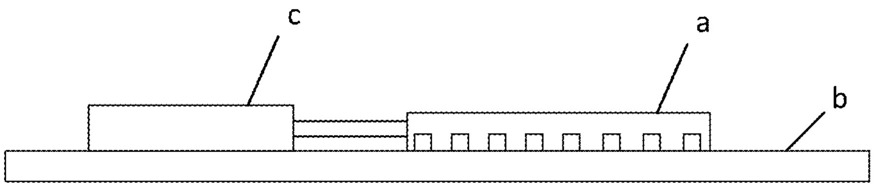
FIG. 10 illustrates a schematic structural diagram of an electronic device illustrates a schematic structural diagram of a storage member according to some embodiments of the present disclosure.

As shown in FIG. 10, embodiments of the present disclosure further provide an electronic device, including a motherboard a, the storage member b of any one embodiment above.

The storage member b can be but is not limited to a hard drive (module). The electronic device can be but is not limited to a laptop computer.

In some other embodiments, the electronic device can further include a power supply management controller c, a first interface pin arranged at the motherboard a and matching the first data interface of the storage member b, and a second interface pin corresponding to the second data interface.

The power supply management controller c can control the power parameter of the storage member through the first power supply circuit connected to the first data interface and/or the second power supply circuit connected to the second data interface when the storage member b is in different application modes.

The first interface pin can be connected to the metal pin of the first data interface through welding. The second interface pin can be connected to the metal pin of the second data interface through welding.

That is, the electronic device can further include the power supply management controller c, which can be connected to the processor and the storage member to adjust the power supply for the storage member according to the instruction of the processor. In some embodiments, two power supply circuits can be provided between the power management controller and the storage member and include the first power supply circuit and the second power supply circuit. The power supply voltages of the two power supply circuits can be different. For example, the voltage of one power supply circuit can be 3V3 voltage, and the voltage of the other power supply circuit can be 3V3-s. The later voltage is smaller than the former voltage. The first power supply circuit can at least supply power to the first data interface. The second power supply circuit can at least supply power to the second data interface. For example, the two power supply circuits can also supply power to the controller and storage area of the storage member. That is, power can be supplied to the device that supports dual-voltage operation.

In some other embodiments, the first interface pin matching the first data interface of the storage member and the second interface pin matching the second data interface can be arranged at the motherboard a. the storage member can be directly arranged at the motherboard. The metal pins (i.e., gold finger) of the two interfaces can be welded to the corresponding pins on the motherboard. Thus, the processor or the power supply management controller arranged on the motherboard can be connected to the storage member through the wires arranged on the motherboard and the pins to supply power or transmit data. That is, based on the setting method of embodiments of the present disclosure, the target storage member can be arranged in the electronic device in an onboard form. Especially for the storage member for storing the boot system, in response to requiring that the storage member storing the boot system data needs to be arranged in the onboard form, the effect can be effectively realized in embodiments of the present disclosure to cause the storage member of embodiments of the present disclosure to support storing the system data such as the boot system.

Figure 9:
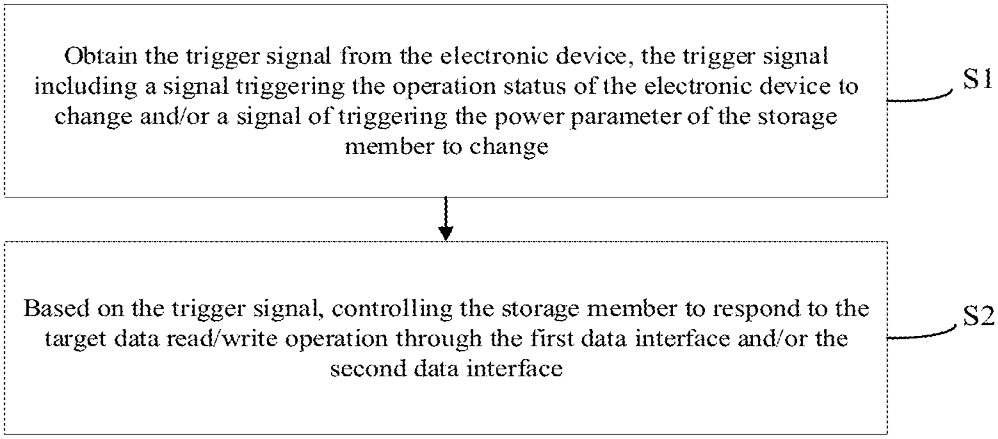
FIG. 9 illustrates a schematic flowchart of a control method of a storage member according to some embodiments of the present disclosure.

As shown in FIG. 9, embodiments of the present disclosure further provide a storage member control method. The method includes the following processes.

At S1, the trigger signal from the electronic device is obtained. The trigger signal includes a signal triggering the operation status of the electronic device to change and/or a signal of triggering the power parameter of the storage member to change.

At S2, based on the trigger signal, the storage member is controlled to respond to the target data read/write operation through the first data interface and/or the second data interface.

For Example,

For example, the storage member or a member configured to control the operation of the storage member, e.g., a processor, and a power supply management device, can receive the trigger signal generated by the electronic device based on the operation status change, or the signal capable of triggering the power parameter of the storage member to change. For example, the power supply management device can respond to the operation status change of the device or receive the instruction of the processor to change the power supply voltage for the storage member, and then the trigger signal can be generated. Then, based on the trigger signal, the storage member can be controlled to respond to the target data read/write operation through the first data interface and/or the second data interface. For example, if only the first data interface is turned on, all data read/write requests of the current phase can be responded to through the first data interface. In some other embodiments, only the second data interface can be turned on, and all data read/write requests of the current phase can be responded to through the second data interface. In some other embodiments, the first data interface and the second data interface can be turned on simultaneously, and the data read/write requests matching the interface functions of the current phase can be responded to through the two interfaces.

In some embodiments, based on the trigger signal, controlling the storage member to respond to the target data read/write operation through the first data interface and/or the second data interface can include at least one of the following processes.

At S3, if the trigger signal is used to trigger the electronic device to switch from the first operation status to the second operation status, the storage member is controlled to respond to the first data read/write operation used to cause the electronic device to switch from the first operation status to the second operation status.

At S4, if the trigger signal indicates that the storage member switches from the first power parameter to the second power parameter, the storage member is controlled to respond to the target data read/write operation through the second data interface or respond to the target data read/write operation through the first data interface and the second data interface.

At S5, if the trigger signal indicates that the storage member switches from the second power parameter to the first power parameter or the electronic device switches back to the first operation status, the storage member is controlled to respond to the target data read/write operation through the first data interface.

For example, if the trigger signal indicates that the electronic device switches from the power-off status or standby status to the normal operation status, the storage member can be controlled to respond to the first data read/write operation used to cause the electronic device to switch from the first operation status to the second operation status through the second data interface.

If the trigger signal indicates that the storage member switches from the first power parameter with parameters being low to the second power parameter with parameters being high, for example, from a low voltage status to a high voltage status, and from a low power status to a high power status, the storage member can be controlled to respond to the target data read/write operation through the second data interface or through the first data interface and the second data interface.

If the trigger signal indicates that the storage member switches from the second power parameter to the first power parameter, or the electronic device switches back to the first operation status, i.e., from the high voltage status and high power status to the low voltage status and the low power status, or the device as a whole switches from the normal operation status to the standby status, the storage member can be controlled to respond to the target data read/write operation through the first data interface.

Embodiments of the present disclosure further provide a storage medium. The storage medium can include a stored program. When the program is running, the device including the storage medium can be controlled to perform the above control method for the storage member of embodiments of the present disclosure.

Embodiments of the present disclosure further provide a computer program product. The computer program product can be tangibly stored on a computer-readable medium and include the computer-readable instruction. When the computer-readable instruction is executed, the at least one processor can be caused to perform the control method for the storage member above. The solutions of embodiments of the present disclosure can have the technical effects corresponding to the above method, which is not repeated here.

The above are embodiments of the present disclosure and are not used to limit the present disclosure. The scope of the present disclosure is limited by the claims. Those skilled in the art can make various modifications or equivalent replacements to embodiments of the present disclosure within the essence and scope of the present disclosure. These modifications or equivalent replacements are within the scope of the present disclosure.

What is claimed is:

1. A control method comprising:

obtaining a trigger signal that changes an operation status of an electronic device; and controlling a target storage member of the electronic device to switch to an application mode corresponding to the trigger signal, the application mode comprising a first application mode or a second application mode, the target storage member comprising a first data interface, a second data interface, a controller core, and a storage area, wherein the first data interface and the second data interface are each configured to communicate data between the target storage member and a member of the electronic device external to the target storage member, the first data interface is configured to transmit data according to a first data transmission protocol, and the second data interface is configured to transmit data according to a second data transmission protocol different from the first data transmission protocol, wherein, when the target storage member is in the first application mode, the target storage member responds to first data read/write operations through a first data read/write path formed by the first data interface, the controller core, and the storage area, wherein, when the target storage member is in the second application mode, the target storage member responds to second data read/write operations through a second data read/write path formed by the second data interface, the controller core, and the storage area, and the first data read/write path and the second data read/write path are different from one another;

wherein the target storage member is associated with first configuration parameters when the target storage member is in the first application mode, the target storage member is associated with second configuration parameters when the target storage member is in the second application mode, and the first configuration parameters are different from the second configuration parameters.

2. The method according to claim 1, wherein controlling the target storage member of the electronic device to switch to the application mode corresponding to the trigger signal includes:

in response to the trigger signal comprising a first trigger signal for the electronic device to switch from a first operation status to a second operation status, loading a boot system of the electronic device from the target storage member in the first application mode; and after the boot system completes a target task, controlling the target storage member to switch from the first application mode to the second application mode to allow the target storage member to respond to a data read/write operation of a member of the electronic device;

wherein power consumption of the target storage member in the first application mode is lower than power consumption of the target storage member in the second application mode.

3. The method according to claim 1, wherein controlling the target storage member of the electronic device to switch to the application mode corresponding to the trigger signal includes at least one of:

in response to the trigger signal comprising a second trigger signal of the electronic device switching from a second operation status to a first operation status, controlling the target storage member to switch from the second application mode to the first application mode;

in response to the trigger signal comprising a third trigger signal of the electronic device switching from a third operation status to the first operation status, controlling the target storage member to switch from the second application mode to the first application mode; or in response to the trigger signal comprising a fourth trigger signal of the electronic device switching from the second or third operation status to a fourth operation status, controlling the target storage member to switch from the second application mode to a third application mode;

wherein the power consumption of the target storage member in the second application mode is greater than power consumption of the target storage member in the first application mode.

4. The method according to claim 3, wherein controlling the target storage member of the electronic device to switch to the application mode corresponding to the trigger signal includes:

controlling the target storage member to switch to a corresponding data interface and/or a power parameter to respond to the first or second data read/write operations from the electronic device.

5. The method according to claim 4, wherein:

controlling the target storage member to switch from the first application mode to the second application mode includes:

controlling the target storage member to switch from the first data interface to the second data interface, and controlling the target storage member to switch from a first power parameter to a second power parameter, to respond to the second data read/write operations of a member of the electronic device through the second data interface; and/or controlling the target storage member to switch from the second application mode to the first application mode includes:

controlling the target storage member to switch from the second data interface to the first data interface, and controlling the target storage member to switch from the second power parameter to the first power parameter, to respond to the first data read/write operations from the electronic device through the first data interface;

wherein a data read/write rate of the target storage member performed through the first data interface is less than a data read/write rate performed through the second data interface, and the power consumption of the target storage member in the first power parameter is less than the power consumption of the target storage member in the second power parameter.

6. The method according to claim 4, wherein controlling the target storage member to switch to the corresponding data interface and/or power parameter to respond to the first or second data read/write operations from the electronic device includes:

in response to the trigger signal comprising a first trigger signal of the electronic device switching from the first operation status to the second operation status, loading a boot system of the electronic device from the target storage member through the first data interface; and after the boot system completes a target task, controlling the target storage member to switch from the first data interface to the second data interface, and controlling the target storage member to switch from a first power parameter to a second power parameter, to respond to the second data read/write operations of a member of the electronic device through the second data interface;

wherein a data read/write rate of the target storage member performed through the first data interface is less than a data read/write rate of the target storage member performed through the second data interface, and power consumption of the target storage member in the first power parameter is less than power consumption of the target storage member in the second power parameter.

7. The method according to claim 6, wherein:

loading the boot system of the electronic device through the first data interface includes:

loading the boot system of the electronic device through the first data read/write path, the first data read/write path further comprising a physical layer of the second data interface; and responding to the second data read/write operations of the member of the electronic device through the second data interface includes:

responding to the second data read/write operations through the second data read/write path.

8. The method according to claim 1, further comprising at least one of:

in response to obtaining data read/write operations from a first member and a second member of the electronic device, responding to the data read/write operations from the first member and the second member through an only data read/write channel between the controller core and the storage area of the target storage member, the first member performing the data read/write operation on a first block in the storage area, and the second member performing the data/write operation on a second block in the storage area through the second data interface; or in response to obtaining the data read/write operations from the first member and the second member of the electronic device, responding to the data read/write operation from the first member through a first data read/write channel between the controller core and the storage area of the target storage member, and responding to the data read/write operation from the second member through a second data read/write channel between the controller core and the storage area of the target storage member, wherein the first member performs the data read/write operation on the first block of the storage area through the first data interface, and the second member performs the data read/write operation on the second block in the storage area through the second data interface.

9. The method according to claim 1, further comprising at least one of:

in response to a failure in loading data from a first block of the storage area of the target storage member, performing address search, by the controller core of the target storage member, on a backup block of a target data file in the first block to load the target data file from the backup block.

10. A storage apparatus comprising:

a main control chip configured to control configuration parameters of the storage apparatus in one of a plurality of application modes including a first application mode and a second application mode;

a storage area having a data read and write channel with the main control chip and configured to store data content; and a first data interface and a second data interface connected to the main control chip, wherein, when the storage apparatus is in the first application mode, the storage apparatus responds to first data read and write operations through a first data read and write path formed by the second data interface, a controller core of the main control chip, the data read and write channel, and the storage area, wherein the first data interface and the second data interface are each configured to communicate data between the storage apparatus and a member of an electronic device external to the storage apparatus, the first data interface is configured to transmit data according to a first data transmission protocol, and the second data interface is configured to transmit data according to a second data transmission protocol different from the first data transmission protocol, wherein, when the storage apparatus is in the second application mode, the storage apparatus responds to second data read and write operations through a second data read and write path formed by the first data interface, the controller core, the data read and write channel, and the storage area, and the first data read and write path and the second data read and write path are different from one another, and wherein the storage apparatus is associated with first configuration parameters when the storage apparatus is in the first application mode, the storage apparatus is associated with second configuration parameters when the storage apparatus is in the second application mode, and the first configuration parameters are different from the second configuration parameters.

11. The storage apparatus according to claim 10, wherein the controller core stores configuration information of the storage apparatus in the plurality of application modes to cause the storage apparatus to operate in one of the plurality of application modes;

the main control chip includes a first interface physical layer connected to the controller core through a first bus to cause the storage apparatus to provide the first data interface;

the main control chip includes a second interface physical layer connected to the controller core through a second bus to cause the storage apparatus to provide the second data interface; and the first data read and write path further comprises the second interface physical layer, and the second data read and write path further comprises the first interface physical layer.

12. The storage apparatus according to claim 10, wherein the controller core stores configuration information of the storage apparatus in the plurality of application modes to cause the storage apparatus to operate in one of the plurality of application modes;

the main control chip includes a first interface physical layer connected to the controller core through a bus to cause the storage apparatus to provide the first data interface;

the main control chip includes a first bridge chip connected to the first interface physical layer through a switch to cause the storage apparatus to use the same bus between the first interface physical layer and the controller core to provide the second data interface; and the first data read and write path further comprises the first interface physical layer, the switch, and the first bridge chip, and the second data read and write path further comprises the first interface physical layer.

13. The storage apparatus according to claim 10, further comprising:

a first power supply circuit configured to supply power to the main control chip and the storage area through the first data interface; and a second power supply circuit configured to supply power to the main control chip and the storage area through the second data interface;

wherein:

for each application mode, the storage apparatus is powered selectively via the first power supply circuit or via the second power supply circuit; and a power supply voltage provided by the first power supply circuit is greater than a power supply voltage provided by the second power supply circuit.

14. The storage apparatus according to claim 10, wherein the storage area includes:

at least a first area block configured for a first type data read and write operation; and at least a second area block configured for a second type data read and write operation, the second type being different from the first type;

wherein data read and write operations supported by the storage apparatus have different types when the storage apparatus is in different ones of the plurality of application modes.

15. The storage apparatus according to claim 14, wherein:

the controller core of the main control chip has a first data read and write channel to the first area block and a second data read and write channel to the second area block to respond to the different types of data read and write operations through the first data read and write channel or the second data read and write channel; or the first area block and the second area block share a third data read and write channel between the storage area and the controller core of the main control chip, the third data read and write channel responding to data read and write operations for the first area block and the second area block at different times.

16. An electronic device comprising:

a motherboard; and a storage apparatus including:

a main control chip configured to control configuration parameters of the storage apparatus in a plurality of application modes including a first application mode and a second application mode;

a storage area having a data read and write channel with the main control chip and configured to store data content; and a first data interface and a second data interface connected to the main control chip, wherein the first data interface and the second data interface are each configured to communicate data between the storage apparatus and a member of the electronic device external to the storage apparatus, the first data interface is configured to transmit data according to a first data transmission protocol, and the second data interface is configured to transmit data according to a second data transmission protocol different from the first data transmission protocol, wherein, when the storage apparatus is in the first application mode, the storage apparatus responds to first data read and write operations through a first data read and write path formed by the second data interface, a controller core of the main control chip, the data read and write channel, and the storage area, wherein, when the storage apparatus is in the second application mode, the storage apparatus responds to second data read and write operations through a second data read and write path formed by the first data interface, the controller core, the data read and write channel, and the storage area, and the first data read and write path and the second data read and write path are different from one another, and wherein the storage apparatus is associated with first configuration parameters when the storage apparatus is in the first application mode, the storage apparatus is associated with second configuration parameters when the storage apparatus is in the second application mode, and the first configuration parameters are different from the second configuration parameters.

17. The device according to claim 16, further comprising:

a power supply management controller configured to control power parameters of the storage apparatus through a first power supply circuit connected to the first data interface and/or a second power supply circuit connected to the second data interface, wherein for each application mode, the storage apparatus is powered selectively via the first power supply circuit or via the second power supply circuit; or the motherboard includes a first interface pin matching the first data interface and a second interface pin matching the second data interface of the storage apparatus, the first interface pin being welded with a metal pin of the first data interface, and the second interface pin being welded with a metal pin of the second data interface.

18. The device according to claim 16, wherein the controller core stores configuration information of the storage apparatus in the plurality of application modes to cause the storage apparatus to operate in one of the plurality of application modes;

the main control chip includes a first interface physical layer connected to the controller core through a first bus to cause the storage apparatus to provide the first data interface;

the main control chip includes a second interface physical layer connected to the controller core through a second bus to cause the storage apparatus to provide the second data interface; and the first data read and write path further comprises the second interface physical layer, and the second data read and write path further comprises the first interface physical layer.

19. The device according to claim 16, wherein the controller core stores configuration information of the storage apparatus in the plurality of application modes to cause the storage apparatus to operate in one of the plurality of application modes;

the main control chip further includes a first interface physical layer connected to the controller core through a bus to cause the storage apparatus to provide the first data interface;

the main control chip further includes a first bridge chip connected to the first interface physical layer through a switch to cause the storage apparatus to use the same bus between the first interface physical layer and the controller core to provide the second data interface; and the first data read and write path further comprises the first interface physical layer, the switch, and the first bridge chip, and the second data read and write path further comprising the first interface physical layer.

20. The device according to claim 16, further comprising:

a first power supply circuit configured to supply power to the main control chip and the storage area through the first data interface; and a second power supply circuit configured to supply power to the main control chip and the storage area through the second data interface;

wherein:

for each application mode, the storage apparatus is powered selectively via the first power supply circuit or via the second power supply circuit; and a power supply voltage provided by the first power supply circuit is greater than a power supply voltage provided by the second power supply circuit.

* * * * *